(12) United States Patent
Yoshioka et al.

(10) Patent No.: US 11,296,535 B2
(45) Date of Patent: Apr. 5, 2022

(54) CONTROL DEVICE FOR ELECTRIC MOTOR

(71) Applicant: Mitsubishi Electric Corporation, Tokyo (JP)

(72) Inventors: Nobuaki Yoshioka, Tokyo (JP); Kenichi Akita, Tokyo (JP); Mitsunori Tabata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 158 days.

(21) Appl. No.: 16/464,461

(22) PCT Filed: Dec. 14, 2016

(86) PCT No.: PCT/JP2016/087223
§ 371 (c)(1),
(2) Date: May 28, 2019

(87) PCT Pub. No.: WO2018/109866
PCT Pub. Date: Jun. 21, 2018

(65) Prior Publication Data
US 2019/0379235 A1 Dec. 12, 2019

(51) Int. Cl.
*H02J 7/14* (2006.01)
*H02J 7/00* (2006.01)
*H02K 11/27* (2016.01)

(52) U.S. Cl.
CPC .............. *H02J 7/14* (2013.01); *H02J 7/0021* (2013.01); *H02K 11/27* (2016.01)

(58) Field of Classification Search
CPC ....................................................... H02J 7/14
See application file for complete search history.

(56) References Cited

U.S. PATENT DOCUMENTS

2004/0155624 A1    8/2004   Amano et al.
2005/0063117 A1    3/2005   Amano et al.
(Continued)

FOREIGN PATENT DOCUMENTS

JP    2004-194364 A    7/2004
JP    2005-297748 A    10/2005
(Continued)

OTHER PUBLICATIONS

Communication dated Mar. 10, 2020, from the Japanese Patent Office in application No. 2018-556089.
(Continued)

*Primary Examiner* — Robert Grant
(74) *Attorney, Agent, or Firm* — Sughrue Mion, PLLC; Richard C. Turner

(57) ABSTRACT

The control device for an electric motor according to this application provides a battery voltage detecting part for detecting a battery voltage at the time of driving a motor driven by a battery, and a minimum voltage holding part for keeping the battery voltage above the predetermined voltage by reducing the consumption current of the electric motor when the battery voltage detected by the battery voltage detecting part falls below a predetermined voltage during driving of the electric motor, so that it is possible to suppress a reduction in battery voltage during driving at low cost, and it is possible to keep the battery voltage above the predetermined voltage.

10 Claims, 5 Drawing Sheets

(56) References Cited

U.S. PATENT DOCUMENTS

| | | |
|---|---|---|
| 2006/0158162 A1 | 7/2006 | Inaba et al. |
| 2009/0183557 A1 | 7/2009 | Ono |
| 2012/0046893 A1* | 2/2012 | Kaneko .................. B60L 58/18 |
| | | 702/63 |

FOREIGN PATENT DOCUMENTS

| | | |
|---|---|---|
| JP | 2009-061896 A | 3/2009 |
| JP | 2009-261172 A | 11/2009 |
| JP | 2016-015825 A | 1/2016 |
| WO | 2010/134625 A1 | 11/2010 |
| WO | 2013/080416 A1 | 6/2013 |
| WO | 2015/181884 A1 | 12/2015 |

OTHER PUBLICATIONS

Communication dated Nov. 7, 2019 from European Patent Office in counterpart EP Application No. 16923815.1.
International Search Report for PCT/JP2016/087223 dated Dec. 14, 2016 [PCT/ISA/210].
Communication dated Mar. 23, 2021, from the European Patent Office in European Application No. 16923815.1.

* cited by examiner

CONTROL DEVICE FOR ELECTRIC MOTOR

CROSS REFERENCE TO RELATED APPLICATIONS

This application is a National Stage of International Application No. PCT/JP2016/087223 filed Dec. 14, 2019.

TECHNICAL FIELD

This application relates to a control device for an electric motor, and can be applied to a control device of a generator motor which is mainly mounted on a vehicle, operates as an electric motor, during the start of the engine and the assisting torque, and also operates as a generator after the start of the engine.

BACKGROUND ART

In the recent years, in order to improve fuel economy and conforming to environmental standards, vehicles have been developed for the purpose of conformity with environmental standards, mounting a generator motor, stopping the engine when the vehicle is stopped and restarting the engine with the generator motor when starting the vehicle. Since the generator motor used for such vehicle is required to be compact, low cost, with a high torque, driving with square wave energization is often performed using a wound field type generator motor.

In the case of operating such electric motor with the electric power supplied from the battery, the battery voltage lowers because frequent excessive electric power supply is required. In addition, at low temperatures or when battery deterioration is advanced, the voltage reduction becomes particularly large. As a suppression means for this voltage reduction, a power supply control device provided in the vehicle system, a change in the power supply voltage predicted based on the battery state and the operation state of the electric load, and a current of the electric load limited by the load controller are proposed.
(See Patent Literature 1)

PRIOR ART DOCUMENT

Patent Literature

[Patent Literature 1] JP2004-194364A

DISCLOSURE OF INVENTION

Technical Problem

However, in Patent Document 1, as the installation of a power supply control device and a load controller for a conventional vehicle system are required, there are problems such as increase in number of man-hours for development, cost increase, space pressure, etc.

This application was made to solve the above-described problems, and it is an object of the invention to provide a control device for an electric motor that autonomously reduces the motor output based on the battery voltage.

Solution to Problem

The control device for an electric motor according to this application provides a battery voltage detecting part for detecting a battery voltage at the time of driving a motor driven by a battery, and a minimum voltage holding part for keeping the battery voltage above the predetermined voltage by reducing the consumption current of the electric motor when the battery voltage detected by the battery voltage detecting part falls below a predetermined voltage during driving of the electric motor, so that the battery voltage can be maintained above the predetermined voltage.

Advantageous Effects of Invention

According to this application, it is possible to suppress the voltage reduction of the battery during driving at low cost, and to keep the battery voltage above the predetermined voltage.

DESCRIPTION OF EMBODIMENTS

First Embodiment

Hereinafter, the first embodiment of the present application will be described with reference to the drawings.

Figure 1:
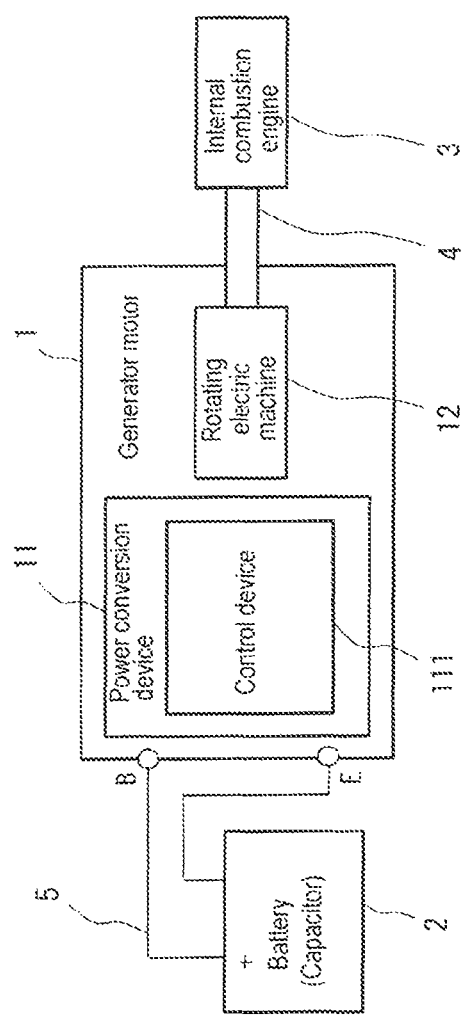
FIG. 1 is a vehicle system configuration diagram showing a schematic configuration of a generator motor mounting a control device and a vehicle system mounting a generator motor according to the present application.

FIG. 1 is an explanatory view showing a vehicle system mounting a generator motor equipped with a control device according to the present application.

In FIG. 1, the generator motor 1 is composed of a power conversion device 11 and a rotating electric machine 12. The rotating electric machine 12 is connected to the internal combustion engine 3 via the power transmission mechanism 4 such as a belt. In the rotating electric machine 12, when the internal combustion engine 3 is started, electric power is supplied to the generator motor 1 from a power supply 2 including a battery or a capacitor via a wiring harness (hereinafter referred to as "harness") 5 and operates, the internal combustion engine 3 is rotated via the power transmission mechanism 4 to start the internal combustion engine 3.

Figure 2:
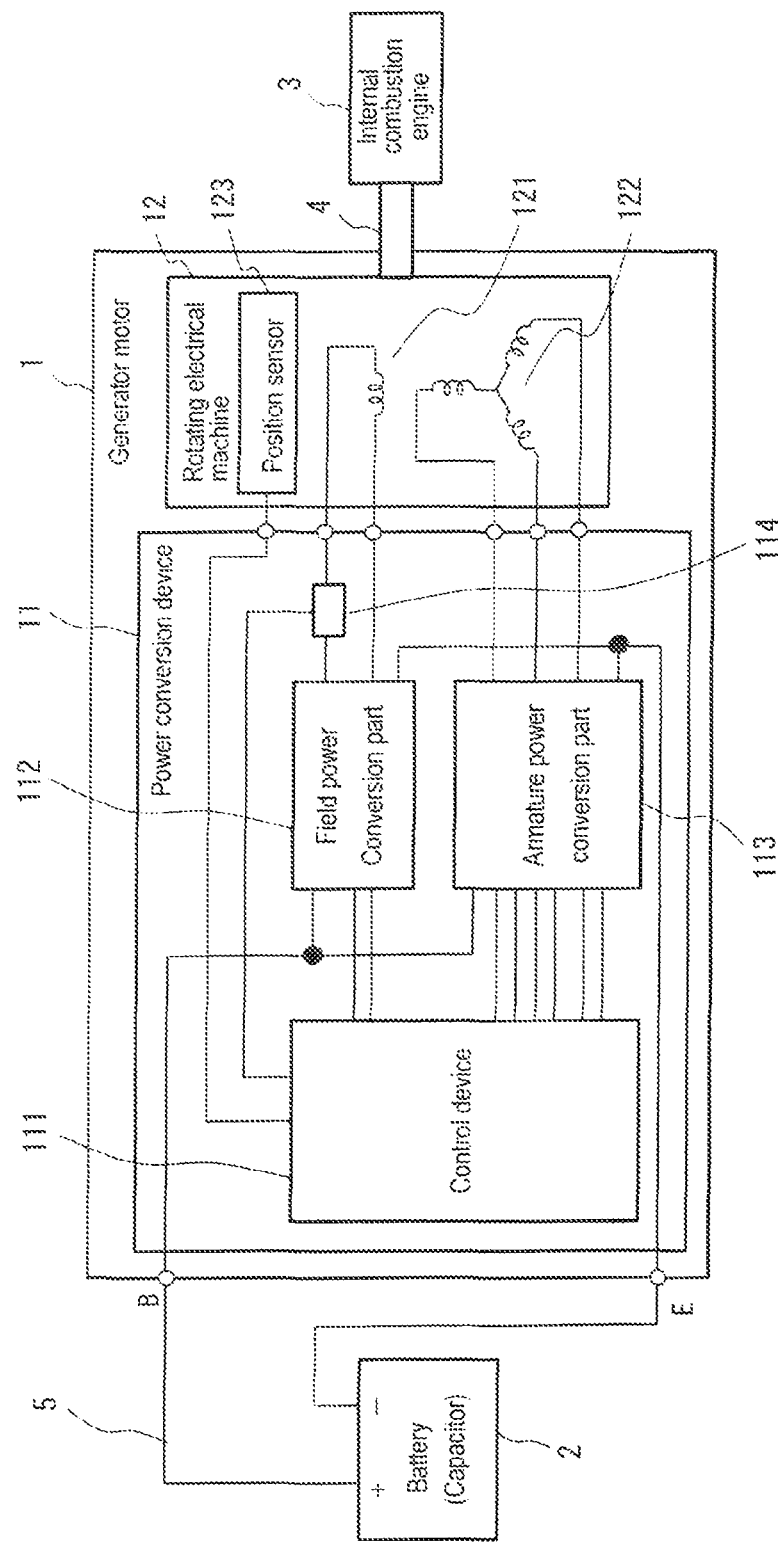
FIG. 2 is a vehicle system configuration diagram showing in detail the configuration of a power conversion device and a rotating electric machine according to a first embodiment of the present application.

FIG. 2 is an explanatory view showing details of the generator motor 1. The rotating electric machine 12 is a field winding type synchronous machine, and includes an armature winding 122 provided in a stator and a field winding 121 provided in the rotor. Further, the rotating electric machine 12 is provided with a position sensor 123 detecting the rotational position and rotational speed of the rotor.

The power conversion device 11 provides a field power conversion part 112 connected to the field winding 121 of the rotating electric machine 12, an armature power conversion part 113 connected to the armature winding 122 of the rotating electric machine 12, a control device 111 for generating on/off commands (hereinafter referred as the gate signal) of the power conversion elements to the field power conversion part 112 and the armature power conversion part 113, and a current sensor 114 for detecting the field current. The power conversion device 11 composes the control device of the generator motor according to the first embodiment of the present application.

The field power conversion part 112 operates based on a gate signal from the control device 111 and controls the field current flowing through the field winding 121 by PWM control. The field power conversion part 112 is generally composed of a half-bridge circuit of a MOSFET.

Based on the gate signal from the control device 111, the armature power conversion part 113 applies three-phase AC voltages (Vu, Vv, Vw) to the armature coil 122 to energize the armature current. Further, at the same time, the field current is supplied from the field power conversion part 112 to the field winding 121. As a result, the rotating electric machine 12 operates as a three-phase synchronous motor and starts the internal combustion engine 3 via the power transmission mechanism 4.

Further, a three-phase bridge circuit using a MOSFET is used as the armature power conversion part 113.

Next, the operation of the control part of the configured generator motor according to the first embodiment of the present application will be described.

Figure 3:
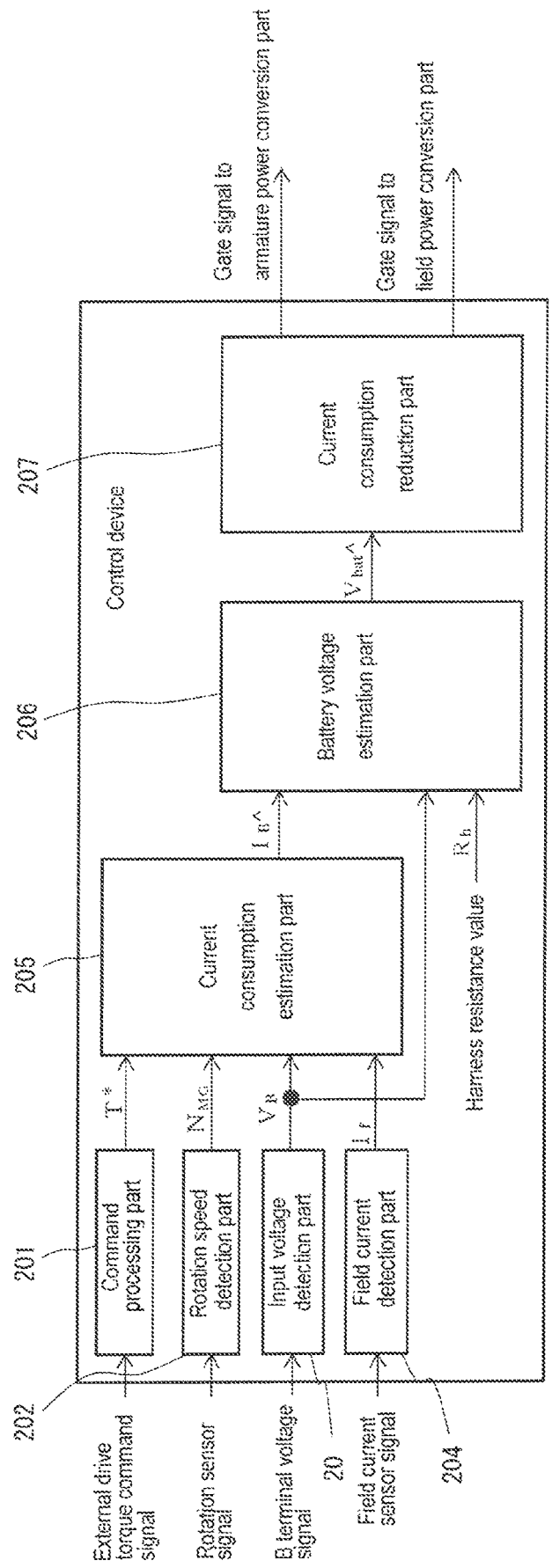
FIG. 3 is a block diagram showing connection between control blocks to estimate a voltage of a battery terminal part and phase relationship between functions according to the first embodiment of the present application.

FIG. 3 shows the relationship of control blocks to estimate the voltage of the battery terminal part.

When the generator motor is commanded to be driven by the host controller, the consumption current estimation part 205 estimates the instantaneous value of the consumption current $I_B\hat{}$ according to the operating state in real time. Based on the generator motor receives the drive torque command value T* from the command processing part 201, the rotation speed $N_{M\_G}$ detected by the rotational speed detector part 202, the input voltage $V_B$ detected by the B terminal voltage detection part 203, and the field current if detected by the field current detection part 204.

Note that the consumption current is a direct current supplied from the battery to the generator motor.

Further, in the consumption current estimation process, a map for calculating the current consumption may be prepared in advance from these elements and may be referred to it.

Next, based on the wiring resistance $R_h$ of the harness 5 connecting the power source 2 and the generator motor, the consumption current $I_B\hat{}$ and the B terminal voltage $V_B$, the battery voltage estimation part 206, which is the battery voltage detection part, estimates the battery voltage $V_{bat}\hat{}$ according to Ohm's law by the following equation 1.

$$V_{bat}\hat{} = V_B + R_h \cdot I_B\hat{} \quad \text{(Equation 1)}$$

Further, the wiring resistance Rh is held in advance in the control device as a fixed value and is referred to at the time of calculation.

Then, in the consumption current reduction part 207 which is the lowest voltage holding part, when the generator motor drives an electric motor load of an internal combustion engine when lower than the minimum voltage required at least for the driving (Hereinafter referred as "voltage drop determination threshold"), the instantaneous value of the battery voltage estimated value Vbat̂ controls the gate signal from the control device 111 to the field power conversion part and the armature power conversion part while the generator motor is constantly driven, thereby reducing the current consumption so that the battery voltage is kept equal to or higher than the voltage reduction determination threshold value.

As a means for reducing the current consumption of the electric motor (rotating electric machine 12 in the first embodiment), in the case of performing sinusoidal wave PWM control in which sine wave alternating voltage is applied by the armature electric power conversion part, the DUTY ratio of the gate signal may be reduced and the phase voltage of the armature coil 122 may be reduced, the torque command processed by the command processing part 201 may be corrected downward by PI control until the battery voltage becomes equal to or higher than the voltage reduction determination threshold value, further, the DUTY ratio of the gate signal to the field power conversion part may be reduced.

As described above, in the first embodiment of the present application, without providing a new device in the conventional vehicle system, reduction of the battery voltage during driving is suppressed, it can be kept above the minimum voltage required for driving. Further, since a voltage equal to or higher than a certain value can be held against a decrease in battery voltage during driving, it is possible to avoid an indefinite operation of another ECU using the battery as the operation source. Further, since it can be realized only by adding the calculation program and the data area in the control device 111, it is unnecessary to additionally provide a detection part such as a voltage sensor in the vehicle system, and cost reduction can be achieved.

Second Embodiment

Figure 4:
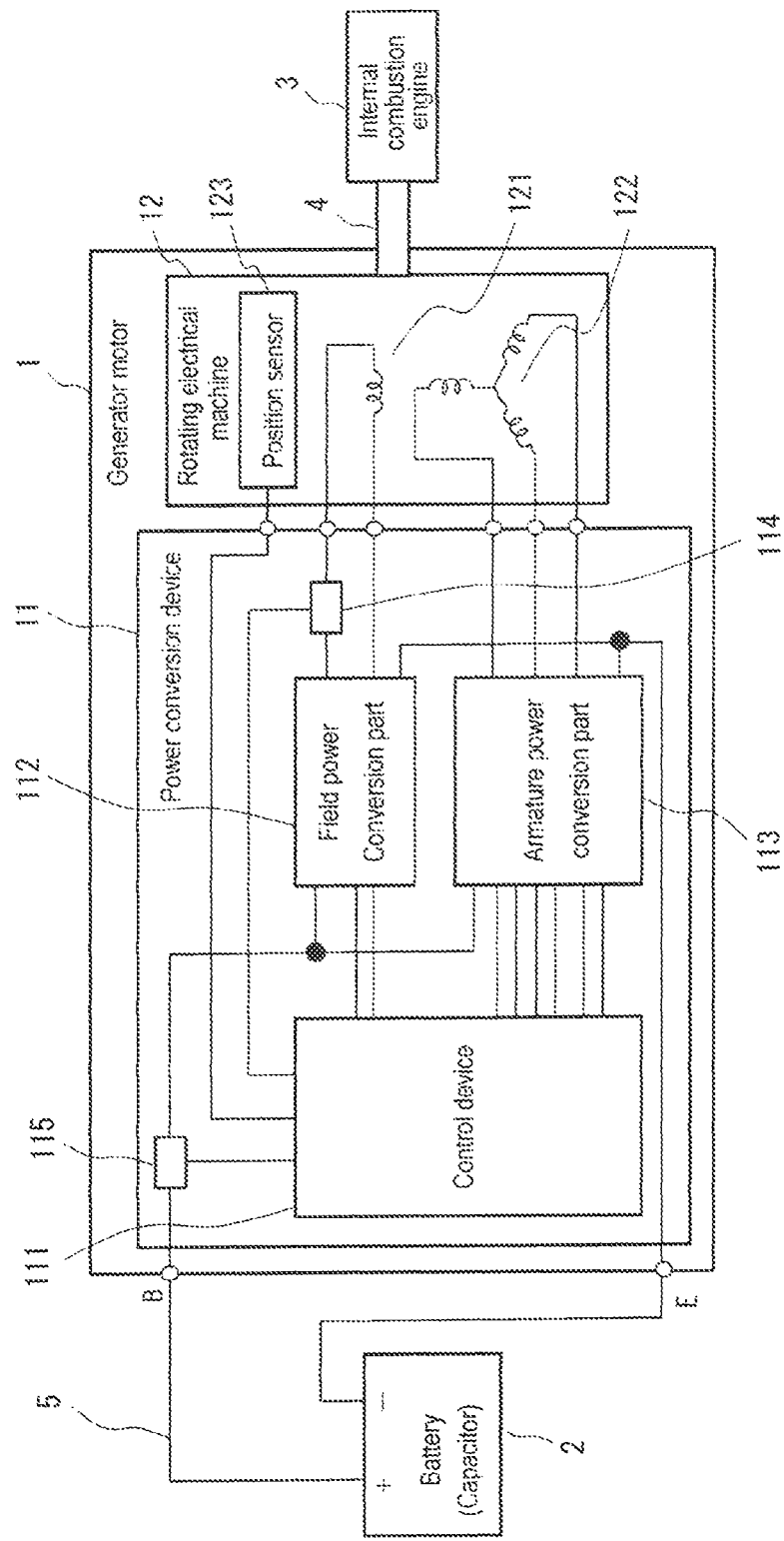
FIG. 4 is a vehicle system configuration diagram showing in detail the configuration of a power conversion device and a rotating electric machine according to a second embodiment of the present application.

In the second embodiment of the present application, a built-in current sensor 115 as shown in FIG. 4 is provided instead of the estimation of the current consumption performed in the first embodiment, and the current consumption is directly detected by the built-in current sensor 115. The current consumption (actual value) $I_B$ supplied from the battery to the generator motor is directly detected. Thereafter, based on the wiring resistance $R_h$ of the harness 5 connecting the power source 2 and the generator motor, the consumption current $I_B$, and the B terminal voltage $V_B$, the battery voltage estimation part 206 estimates the battery voltage $V_{bat}\hat{}$ according to Ohm's law by the following equation 2.

$$V_{bat}\hat{} = V_B + R_h \cdot I_B \quad \text{(Equation 2)}$$

In the consumption current reduction part 207, when the battery voltage estimated value $V_{bat}\hat{}$ is lower than the voltage reduction determination threshold value when the generator motor is driven, the gate signal from the control device 111 to the field power conversion part and the armature power conversion part is driven, thereby reducing the current consumption so that the battery voltage is kept equal to or higher than the voltage reduction determination threshold value.

As described above, in the second embodiment, since the battery voltage is estimated based on the consumption current directly detected by the sensor, the battery voltage with higher accuracy can be estimated.

Third Embodiment

Figure 5:
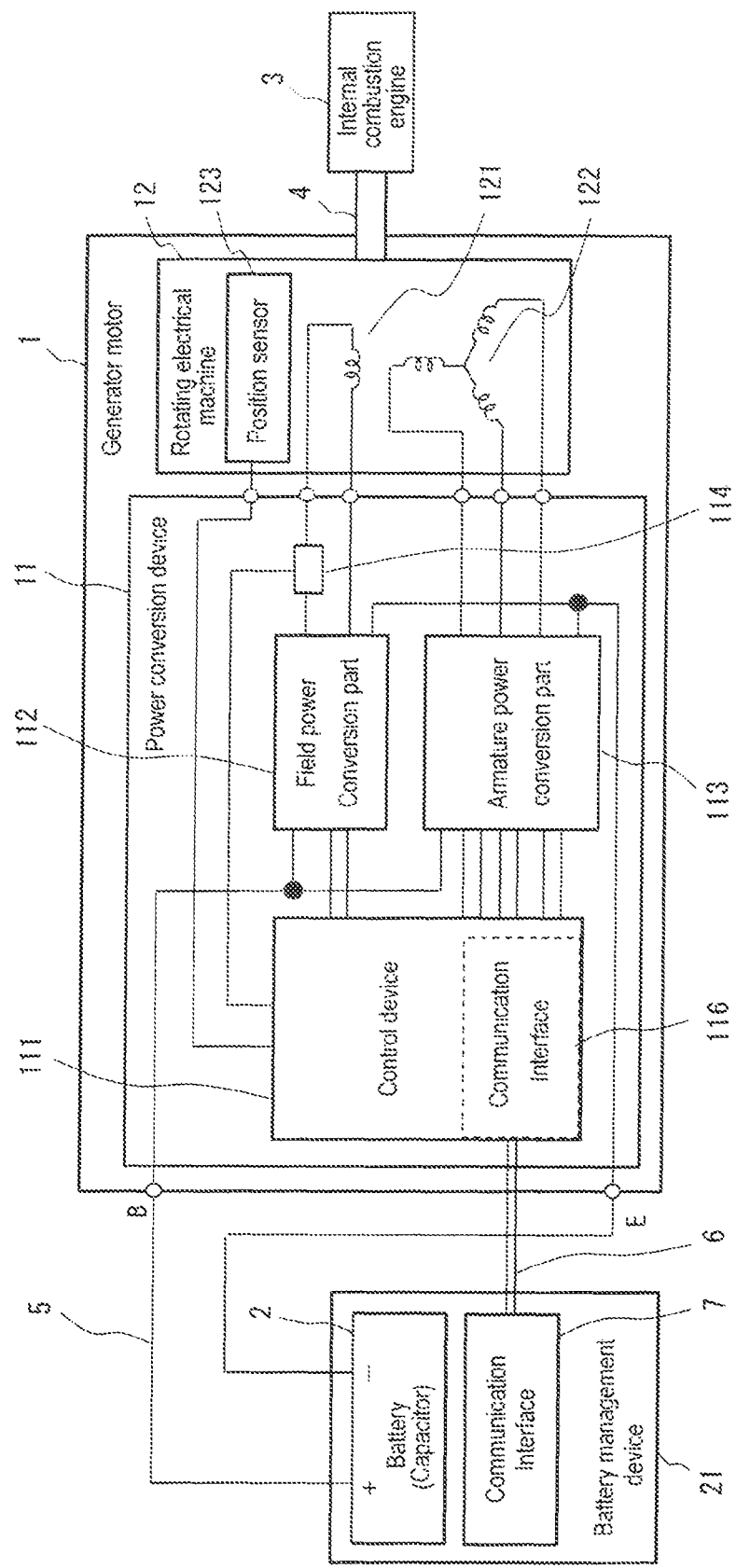
FIG. 5 is a vehicle system configuration diagram showing in detail the configuration of a power conversion device and a rotating electric machine according to a third embodiment of the present application.

In the third embodiment of the present application, instead of the estimation of the current consumption and the estimation of the battery voltage which were performed in the first embodiment, the battery voltage $V_{bat\_comm}$ is acquired and detected via the communication line 6 between the communication interface 7 in the battery management device 21 generally installed in the vehicle and the communication interface 116 of the control device as shown in FIG. 5. In the consumption current reduction part 207, when the battery voltage estimated value $V_{bat\_comm}\hat{}$ is lower than the voltage reduction determination threshold value when the generator motor is driven, the gate signal from the control device 111 to the field power conversion part and the armature power conversion part is driven, thereby reducing the current consumption so that the battery voltage is kept equal to or higher than the voltage reduction determination threshold value.

As described above, in the third embodiment, since consumption current reduction control is performed based on the actual value of the battery voltage, it is possible to hold the voltage of the battery with high control accuracy. However, in this control, real-time nature is important, so high-speed communication is necessary.

In the drawings, the same reference numerals indicate the same or corresponding parts.

Although the present application is described above in terms of an exemplary embodiment, it should be understood that the various features, aspects and functionality described in the embodiment are not limited in their applicability to the particular embodiment with which they are described, but instead can be applied, alone or in various combinations to the embodiment. It is therefore understood that numerous modifications which have not been exemplified can be devised without departing from the scope of the present application. For example, at least one of the constituent components may be modified, added, or eliminated.

REFERENCE SIGNS LIST

1 Generator motor,
2 Battery or capacitor,
3 Internal combustion engine,
4 Power transmission mechanism,
5 Harness (wiring),
6 Communication line,
7 Communication interface of the battery management device,
11 Power conversion device,
12 Rotating electric machine,
21 Battery management device,
111 Control device,
112 Field power conversion part,
113 Armature power conversion part,
114 Field current sensor,
115 Built-in current sensor,
116 Communication interface of the built-in control device,
121 Field coil,
122 Armature coil,
123 Position sensor,
201 Command processing part,
202 Rotational speed detection part,
203 Input voltage detection part,
204 Field current detection part,
205 Consumption current estimation part,
206 Battery voltage estimation part (battery voltage detecting part),
207 Current consumption reduction part (minimum voltage holding part).

The invention claimed is:

1. A control device for electric motor comprising:
    a battery voltage detecting part for detecting a battery voltage at a time of driving an electric motor driven by a battery;
    a minimum voltage holding part for keeping the battery voltage at a predetermined voltage by reducing a consumption current of the electric motor when the battery voltage detected by the battery voltage detecting part falls below the predetermined voltage during driving of the electric motor; and
    a consumption current detection part for detecting the consumption current,
    wherein the battery voltage detection part estimates the battery voltage from the consumption current, a resistance of the wiring connecting the battery and the electric motor, and a voltage at the connection end of the wiring connected to the electric motor, and
    wherein the minimum voltage holding part reduces the consumption current of the electric motor based on the estimated battery voltage.

2. The control device for electric motor according to claim 1, wherein
    the consumption current detected by the consumption current detection part is an estimated value.

3. The control device for electric motor according to claim 1, wherein
    the consumption current detected by the consumption current detection part is a current detected by a built-in current sensor in the motor.

4. The control device for electric motor according to claim 1, wherein
    the battery voltage is detected by communication from a battery management device outside the motor.

5. The control device for an electric motor according to claim 1, wherein
    the battery management device is an in-vehicle battery management device.

6. The control device for an electric motor according to claim 1, wherein
    the battery is an in-vehicle battery, and the electric motor is a vehicle-mounted generator motor.

7. The control device for an electric motor according to claim 2, wherein
    the battery is an in-vehicle battery, and the electric motor is a vehicle-mounted generator motor.

8. The control device for an electric motor according to claim 3, wherein
    the battery is an in-vehicle battery, and the electric motor is a vehicle-mounted generator motor.

9. The control device for an electric motor according to claim 4, wherein
    the battery is an in-vehicle battery, and the electric motor is a vehicle-mounted generator motor.

10. The control device for an electric motor according to claim 5, wherein
    the battery is an in-vehicle battery, and the electric motor is a vehicle-mounted generator motor.

* * * * *